United States Patent [19]

Bennett et al.

[11] Patent Number: 4,935,082

[45] Date of Patent: Jun. 19, 1990

[54] FORMING CORRUGATED BOARD STRUCTURES

[75] Inventors: Peter G. Bennett, Kew; Peter R. McKinlay, Doncaster; Neil W. Shaw, Ivanhoe, all of Australia

[73] Assignee: Amcor Limited, South Melbourne, Australia

[21] Appl. No.: 284,130

[22] Filed: Dec. 14, 1988

[30] Foreign Application Priority Data

Dec. 18, 1987 [AU] Australia ................................ PI5979

[51] Int. Cl.[5] ................................................ B32B 31/08

[52] U.S. Cl. ...................................... 156/205; 156/210; 156/292; 156/462; 156/470; 156/471

[58] Field of Search ............... 156/205, 210, 292, 462, 156/470, 471; 198/844, 957

[56] References Cited

U.S. PATENT DOCUMENTS 690,713 1/1902 Ferres ................................ 156/471

1,802,880 4/1931 Cumfer ........................... 156/471 X 3,700,518 10/1972 Ohmori .......................... 156/205 X

FOREIGN PATENT DOCUMENTS 393156 12/1908 France .

*Primary Examiner*—Robert A. Dawson

*Attorney, Agent, or Firm*—Bucknam and Archer

[57] ABSTRACT

A method and apparatus for manufacturing a corrugated product in which the corrugated mediums are bonded at their flute tips with no intervening liner. A corrugated belt or belts is provided to withdraw the bonded and aligned mediums in a substantially straight line from the pair of corrugating rolls which are synchronised to achieve the alignment and bonding of the flute tips of the two mediums. The corrugated belt provides support and constraint for the bonded mediums until the bond is set or until a liner sheet is bonded to one of the mediums.

5 Claims, 2 Drawing Sheets

FORMING CORRUGATED BOARD STRUCTURES

Figure 1:
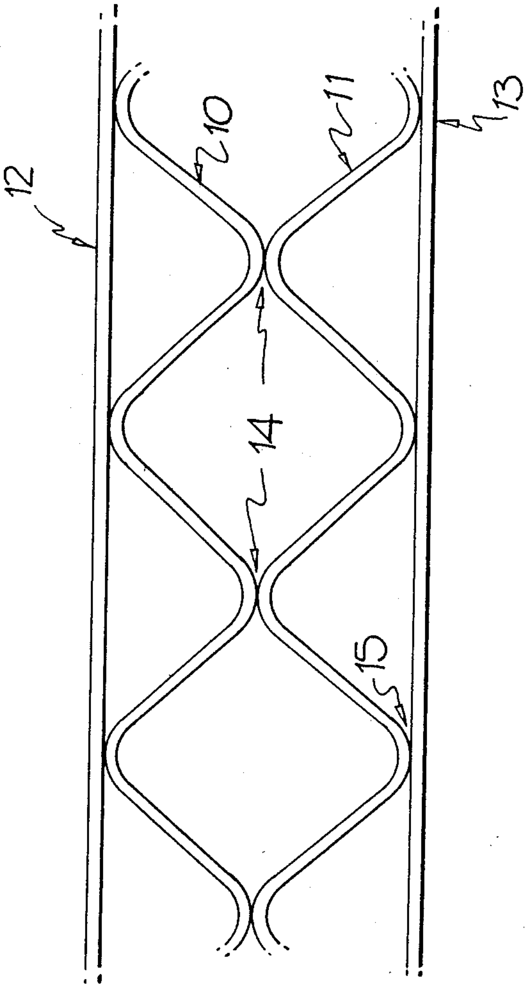

This invention relates to a method of forming sandwich structures, comprising one or more non-corrugated sheet elements (liners) to which are bonded two corrugated (fluted) sheet elements (mediums) which are themselves bonded together.

Australian Patent Application No. 62323/86 discloses an improved corrugated paper board structure in which two layers of corrugated medium (flutes) are bonded together at or adjacent to the peaks of the flutes, and are sandwiched between two outer liners. The disclosures of Application No. 62323/86 are incorporated herein by reference.

Patent Specification No. 62323/86 also discloses a method of forming the structural paper in which two separate layers of corrugating medium are corrugated and then brought into flute tip to flute tip contact on synchronized corrugating rollers.

Conventional machinery for forming corrugated board incorporates a unit for making single faced corrugated board, that is a liner adhered to a single fluted layer. More complex board constructions can be formed by bonding the exposed flutes to another liner and, if desired, subsequently bonding that to another single faced corrugated board.

Although Specification 62323/86 did propose the initial formation of the pair of aligned fluted mediums prior to bonding with liners, it did not address the most effective means of manufacturing this new construction.

In particular it has now been realized that in order to maintain alignment of the flute tips after the initial formation stage and until the adhesive bond has set, the combined mediums should preferably avoid small radius curved travel paths which tend to distort the bond between the flute tips.

A method of forming a corrugated paper product in which two corrugated mediums are bonded together at their aligned flute tips which comprises the steps of a. bringing two corrugated mediums together to align the flute tips and bond the two mediums at their flute tips b. withdrawing the bonded mediums in a substantially straight line away from the initial point of contact of the flute tips until the bonding is completed or a liner sheet has been bonded to one of said corrugated mediums.

The invention also provides apparatus for forming a corrugated paper product in which two corrugated mediums are bonded together at their aligned flute tips comprising a. two synchronized corrugating stations arranged to bring two corrugated mediums into aligned contact at the flute tips b. an adhesive applicating station to apply adhesive to at least one of said corrugated mediums prior to the contacting of the flute tips c. conveyor means arranged adjacent to the corrugating stations to withdraw the bonded corrugated sheets and d. a liner applicator station adjacent said conveyor for bonding a flat liner sheet to one of said corrugated mediums.

The purpose of the conveyor is to support and constrain the bonded mediums to retain their orientation and alignment. The withdrawal of the bonded mediums in a substantially straight line avoids distortion of the aligned flutes which could result in a loss of the orientation and alignment of the flute tips to flute tip bond.

Preferably one of the corrugating means includes a toothed belt or belts with externally arranged teeth corresponding to the corrugations of the sheet material. This toothed belt also acts as a support for the joined corrugated sheets and extends in a substantially straight line from the junction of the corrugating means to a support roller. Adhesive curing means such as a heat source may be located adjacent to the toothed belt downstream of the corrugating stations. Because the joined corrugated sheets should preferably be constrained to prevent extension, a liner feed station may also be located opposite the toothed belt so that a liner can be bonded to the flute tips of one of said pair of corrugated sheets.

The liner material may be selected from amongst conventional paperboard liners or may also include other structurally suitable materials such as wood veneer, metal foil or synthetic plastic sheets.

It is also conceivable to insert reinforcing materials between the aligned corrugated sheets to provide improved strength characteristics to the combined assembly.

Figure 2:
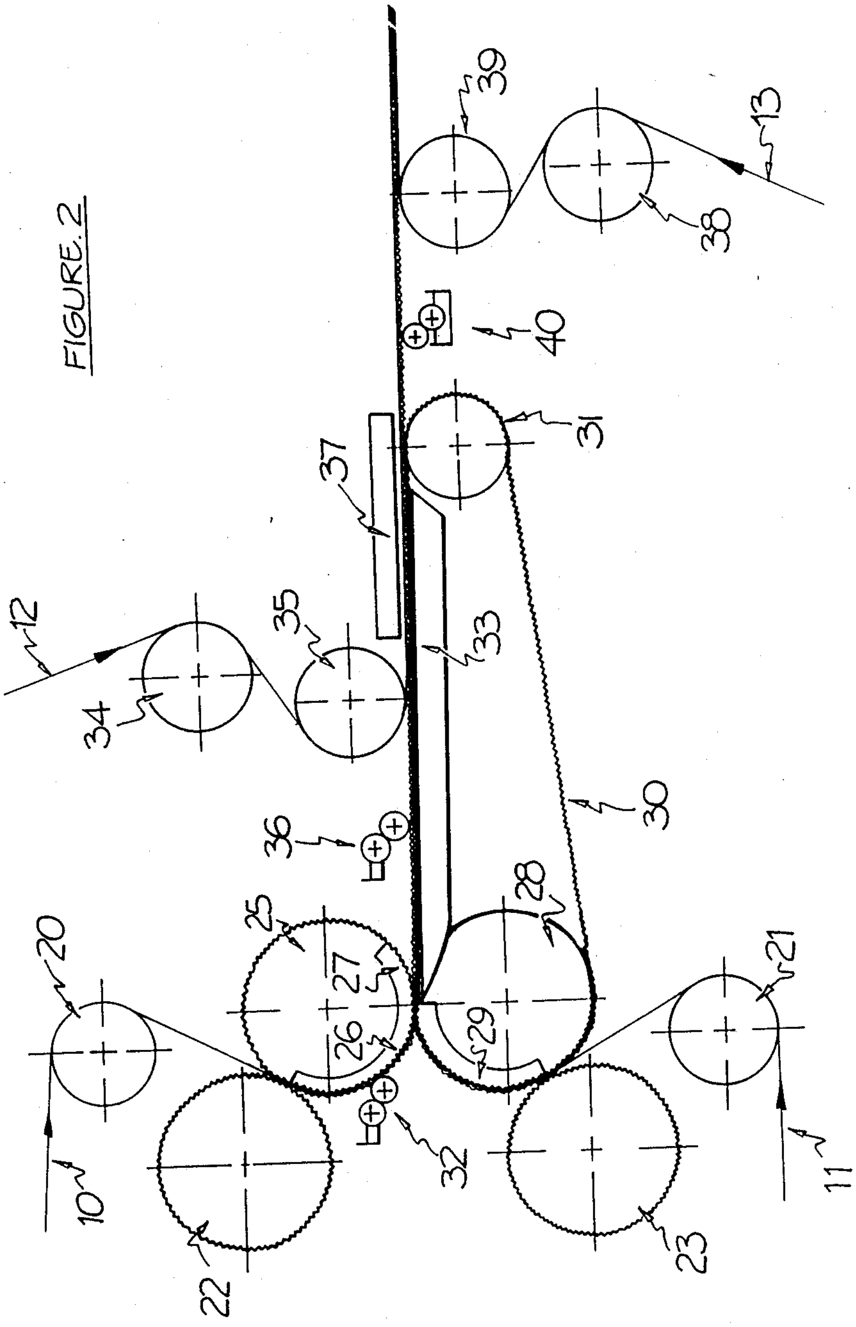

A preferred form of the invention will now be described with reference to the drawings in which FIG. 1 represents a preferred form of product featuring flute tip to flute tip bonding and FIG. 2 is a schematic layout of a preferred form of the apparatus of the invention.

FIG. 1 illustrates one form of structural board formed from paperboard comprising corrugated mediums 10 and 11 bonded at the inner flute tips 14. Liner materials 12 and 13 are adhered to the outer flute tips 15 of the mediums 10 and 11 respectively.

The embodiment illustrated in FIG. 2 comprises preheater guide rolls 20 and 21 for guiding the mediums 10 and 11 respectively into the corrugating rollers 22 and 25 and 23 and 28 respectively.

Rollers 25 and 28 are driven synchronously and are arranged to drive the other parts of the corrugating mechanism. Roller 25 with roller 22 corrugates medium 10. Roller 22 is rotated by roller 25 and the suction zone 26 on roller 25 holds the corrugated medium 10 onto roll 25 as it enters the zone of contact with medium 11.

Roller 28 drives a toothed belt or belts 30 which is an endless belt having a toothed surface adapted to mesh with the teeth of roller 23 to corrugate medium 11. Belt or belts 30 is mounted on rollers 28 and 31. Roller 28 includes a suction zone 29 which acts through the toothed belt 30 to hold the corrugated medium 11 to the belt 30 while it is on the roller 28.

Adhesive is applied to medium 10 by the adhesive applicator 32. The corrugated mediums 10 and 11 are brought into precisely aligned contact at their flute tips by the synchronized roll 25 and belt 30. The combined mediums are supported on the belt 30 and the medium 10 additionally may be released from roller 25 by a blow box 27 mounted internally within the roller 25. After the initial bonding of the two mediums 10 and 11 they are conveyed by belt 30 over a heated suction box 33 which acts to cure the adhesive bond and to hold the combined mediums in place on the belt to ensure that the corrugated shape of both mediums is retained. The top liner 12 is fed around rolls 34 and 35 which may also act as a preheater station. Adhesive is applied to the uppermost flute tips of medium 10 via adhesive applicator unit 36 while the two mediums remain supported by the belt 30. The heater 37 aids in curing the adhesive bond between the liner 12 and the combined mediums. Other forms of energy input suitable for curing adhesive bonds such as high intensity infra red heaters can replace the heated box 33 or the heater 37.

Once a secure bond has been achieved the support of belt 30 is no longer required because the support provided by the adhered liner 12 is sufficient.

The second liner 13 is fed around rolls 38 and 39; which may also act as a preheater station. Adhesive is applied to the lowermost flute tips of medium 11 via adhesive applicator unit 40 and liner 13 is applied to the medium 11 in such a way that the two are bonded together to produce the structure illustrated in FIG. 1.

Further curing or subsequent manufacturing steps can be carried downstream from roller 38.

From the above it can be seen that the present invention provides an effective means of forming a structurally sound corrugated board where the flutes of the mediums are precisely aligned.

We claim:

1. A method of forming a corrugated paper product in which two corrugated mediums are bonded together at their aligned flute tips which consists of:

(a) corrugating two mediums on a pair of corrugating rolls which are aligned and synchronized to bring the flute tips of each medium into contact;

(b) bonding the two mediums at their flute tips;

(c) withdrawing the bonded mediums on a corrugated conveyor extending from the point of contact between the flute tips of the two mediums, in a straight line away from the said initial point of contact, until the bonding is completed or a liner sheet has been bonded to one of said corrugated mediums.

2. A method as claimed in claim 1 wherein a liner sheet is bonded to one of the fluted mediums while the bonded mediums are supported on said conveyor.

3. Apparatus for forming a corrugated paper product in which two corrugated mediums are bonded together at their aligned flute tips comprising a. two synchronized corrugating stations arranged to bring two corrugated mediums into aligned contact at the flute tips b. an adhesive applicating station to apply adhesive to at least one of said corrugated mediums prior to the contacting of the flute tips c. conveyor means arranged adjacent to the corrugating stations to withdraw the bonded corrugated sheets and d. a liner applicator station adjacent said conveyor for bonding a flat liner sheet to one of said corrugated mediums.

4. Apparatus as claimed in claim 3 wherein the conveyor comprises a corrugated belt.

5. The method according to claim 3 wherein said conveyor constrains said flute tips to retain the alignment of the two mediums until the bonding is completed.

* * * * *